US012703206B2

(12) United States Patent
Herbst et al.

(10) Patent No.: US 12,703,206 B2
(45) Date of Patent: Aug. 11, 2026

(54) PNEUMATIC VEHICLE TYRE

(71) Applicant: Continental Reifen Deutschland GmbH, Hannover (DE)

(72) Inventors: Stephan Herbst, Langenhagen (DE); Fabian Zimmermann, Wennigsen (DE); Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 139 days.

(21) Appl. No.: 18/690,642

(22) PCT Filed: Jul. 26, 2022

(86) PCT No.: PCT/DE2022/200170
§ 371 (c)(1),
(2) Date: Mar. 8, 2024

(87) PCT Pub. No.: WO2023/036376
PCT Pub. Date: Mar. 16, 2023

(65) Prior Publication Data

US 2024/0367463 A1 Nov. 7, 2024

(30) Foreign Application Priority Data

Sep. 10, 2021 (DE) ..................... 10 2021 210 020.1

(51) Int. Cl.
*B60C 11/13* (2006.01)

(52) U.S. Cl.
CPC ...... *B60C 11/1353* (2013.01); *B60C 11/1307* (2013.01); *B60C 2011/1338* (2013.01); *B60C 2011/1361* (2013.01)

(58) Field of Classification Search
CPC ......... B60C 11/1307; B60C 2011/1338; B60C 2011/1361
See application file for complete search history.

(56) References Cited

U.S. PATENT DOCUMENTS

2008/0149242 A1 6/2008 Oyama
2019/0160884 A1* 5/2019 Herbst ................ B60C 11/1353
2021/0178826 A1 6/2021 Lutz et al.

FOREIGN PATENT DOCUMENTS

DE 102016213702 A1 2/2018
DE 102017219532 A1 5/2019
(Continued)

OTHER PUBLICATIONS

Machine translation for Europe 3620311 (Year: 2025).*
(Continued)

*Primary Examiner* — Steven D Maki
(74) *Attorney, Agent, or Firm* — Richard A. Wolf; Gregory Adams

(57) ABSTRACT

The invention relates to a pneumatic vehicle tire with a tread with at least one circumferential groove, which is formed to the profile depth and has a groove base and groove flanks, wherein free-standing webs, which are at a distance from one another in the circumferential direction, are elongate in the circumferential direction and have a top surface running parallel to the tread periphery and a height of 7% to 30% of the profile depth, are formed on the groove base, wherein at least one protrusion, which sits on the groove base and is elongate in the circumferential direction, is formed between successive webs in the circumferential direction on and along each groove flank, wherein the one protrusion overlaps the other protrusion with respect to the circumferential direction, at least in portions, so that between the protrusions there remains a groove-base channel, which has a constant width in the axial direction between protrusion edges which are formed on the protrusions and run at a constant depth and in the circumferential direction.

4 Claims, 3 Drawing Sheets

(56) References Cited

FOREIGN PATENT DOCUMENTS

| | | | | | |
|---|---|---|---|---|---|
| EP | 3620311 | A1 | * | 3/2020 | ......... B60C 11/0318 |
| EP | 3620311 | B1 | | 6/2021 | |
| JP | 63-025107 | A | * | 2/1988 | |
| JP | S6325107 | A | | 2/1988 | |
| JP | H06239108 | A | | 8/1994 | |

OTHER PUBLICATIONS

Machine translation for Japan 63-025107 (Year: 2025).*
PCT International Search Report dated Oct. 11, 2022 for the PCT Application No. PCT/DE2022/200170.

* cited by examiner

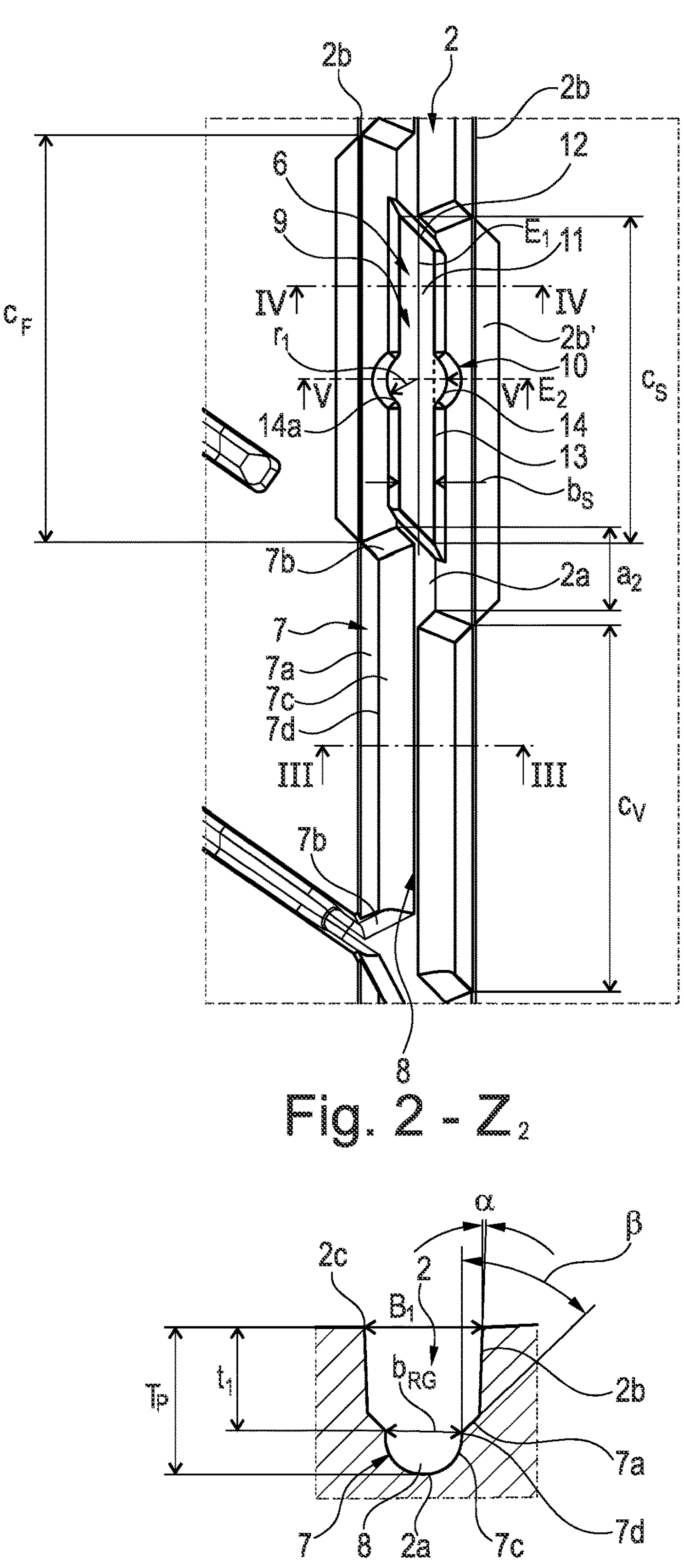
Fig. 2 - $Z_2$
Fig. 3: III - III

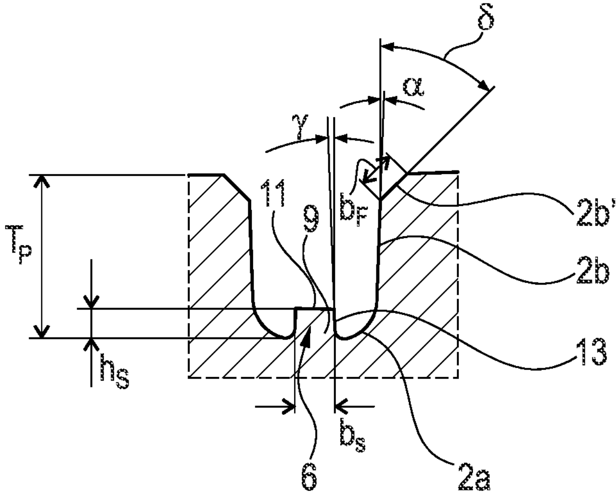
Fig. 4: IV - IV
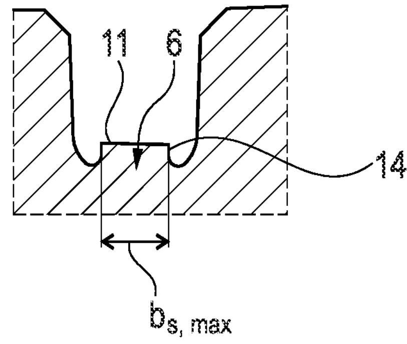
Fig. 5: V - V

PNEUMATIC VEHICLE TYRE

CROSS-REFERENCE TO RELATED APPLICATIONS

The present application is a National Stage Application under 35 U.S.C. § 371 of International Patent Application No. PCT/DE2022/200170 filed on Jul. 26, 2022, which claims priority from German Patent Application No. 10 2021 210 020.1 filed on Sep. 10, 2021, the disclosures of which are herein incorporated by reference in their entireties.

BRIEF SUMMARY

The invention relates to a pneumatic vehicle tire with a tread with at least one circumferential groove, which is formed to the profile depth and has a groove base and groove flanks, wherein free-standing webs, which are at a distance from one another in the circumferential direction, are elongate in the circumferential direction and have a top surface running parallel to the tread periphery and a height of 7% to 30% of the profile depth, are formed on the groove base, wherein at least one protrusion, which sits on the groove base and is elongate in the circumferential direction, is formed between successive webs in the circumferential direction on and along each groove flank, wherein the one protrusion overlaps the other protrusion with respect to the circumferential direction, at least in portions, so that between the protrusions there remains a groove-base channel, which has a constant width in the axial direction between protrusion edges which are formed on the protrusions and run at a constant depth and in the circumferential direction.

Such a tire is known for example from EP 3 620 311 B1. The pneumatic vehicle tire has a tread with a circumferential groove, formed on the groove base of which are free-standing webs, which are at a distance from one another in the circumferential direction, are elongate in the circumferential direction, act as stone ejectors and have a height of 10% to 30% of the profile depth, a width of 25% to 40% of the width of the circumferential groove and a maximum circumferential length, projected in the circumferential direction, of 16.0 mm to 25.0 mm. On the side of each web, the groove edges of the circumferential groove are beveled in portions, wherein the bevels overhang the web in the circumferential direction, at least on one side. Preferably, two protrusions which are elongate in the circumferential direction are in each case formed at the groove flanks in the area between the webs. The bevels increase the groove cross section in portions, which improves the water drainage properties and reduces the likelihood of stones becoming caught in the area of the webs. The elongate protrusions thus interact with the webs in a way that is advantageous for the stone-ejecting effect.

In the case of tires of the type mentioned at the beginning, catching stones, or "stone trapping", may still occur in the circumferential grooves when driving off-road, especially when driving on gravel roads. In the case of tires for SUVs, which are often also driven off-road, it is particularly important when designing webs positioned in the circumferential grooves and acting as stone ejectors also to pay attention to their effect on the water drainage capacity of the circumferential grooves in order to ensure a continued good aquaplaning performance when driving on wet, asphalted roads.

The object of the invention is to reduce further the risk of catching stones in circumferential grooves in a pneumatic vehicle tire of the type mentioned at the beginning, while maintaining a good aquaplaning performance.

According to the invention, the object set is achieved by each web being locally widened on each side in the middle by an outwardly rounded side part, which is partly delimited by the top surface of the web, wherein the one side part lies opposite the other side part and wherein the web has at the side parts a maximum width, determined in the axial direction at the level of the top surface, of at most 100% of the width of the groove-base channel.

The side parts, which widen the web in the middle, stabilize the web laterally and counteract a deformation of the web by stones pressing into the circumferential groove, thereby further reducing the likelihood of catching stones. Due to the side parts, which in plan view are rounded outwardly in the direction of groove flanks, a low-turbulence water flow can continue to occur in the area of the webs when driving on wet road surfaces. Since the width of the webs in the area of the side parts is at most 100% of the width of the groove-base channels which are located between the protrusions connected to the groove flanks, a high water drainage capacity in the circumferential groove, and thus a good aquaplaning performance, is maintained.

According to a preferred design, the maximum width of the web is at least 70%, preferably 80% to 90%, of the width of the groove-base channel. A maximum width of at least 70% is particularly favorable with regard to the stone-repelling effect of the web. The specified preferred range for the maximum width further improves the stone-repelling effect of the web, a maximum width of at most 90% ensuring a particularly low-turbulence water flow in the transitional area between the groove-base channel and the groove passages remaining on the groove flanks at the sides of the web.

Preferably, the constant width of the groove-base channel is 45% to 65%, in particular 50% to 60%, of the width of the circumferential groove at the tread periphery. This measure also contributes to maintaining a good aquaplaning performance.

According to a further preferred design, the web has in the area outside its side parts a width, determined in the axial direction at the level of the top surface, which is at least 0.5 mm, in particular 1.0 mm to 1.5 mm, smaller than the maximum width of the web present in the area of the side parts. This contributes to maintaining a good aquaplaning performance and at the same time reducing the risk of catching stones in the circumferential groove.

A further preferred design is characterized in that the side parts are positioned symmetrically in relation to one another with respect to a longitudinally sectional center plane of the web defined by the circumferential direction and the radial direction. Such a symmetrical positioning of the side part improves the stabilizing effect of the side parts on the web against deformation by stones pressing into the circumferential groove, and thus contributes to a further reduction in the risk of catching stones.

Furthermore, it is preferred if the side parts are symmetrically formed with respect to a cross-sectional center plane of the web defined by the axial direction and the radial direction. Such side parts ensure a particularly uniform, and therefore advantageous, stabilization of the web, and therefore also contribute to a further reduction in the risk of catching stones.

According to a further preferred design, the web has a maximum circumferential length, determined at the level of the top surface and projected in the circumferential direction, of 8.0 mm to 12.0 mm.

The height of the web is preferably 10% to 20% of the profile depth.

In particular, the protrusions on the groove flank have a maximum circumferential length of 18.0 mm to 25.0 mm.

A further preferred design is characterized in that, on the sides of each web, the groove flanks are provided with bevels, which run to the tread periphery, overhang the web in the circumferential direction, at least on one side, run at an angle of 30° to 55°, in particular of 40° to 50°, in relation to the radial direction and have a width of 1.2 mm to 2.0 mm and a circumferential length of 18.0 mm to 25.0 mm. Such bevels are already known from EP 3 620 311 B1 mentioned at the beginning. They increase the groove cross section in portions, which further improves the water drainage properties and further reduces the likelihood of stones becoming caught in the area of the webs.

Further features, advantages and details of the invention will now be described in more detail with reference to the drawing, which schematically shows an exemplary embodiment of the invention. In the drawing:

BRIEF SUMMARY OF DRAWINGS

FIG. 2 shows an enlarged plan view of the detail $Z_2$ of FIG. 1, FIG. 3 shows a section along the line III-III of FIG. 2, FIG. 4 shows a section along the line IV-IV of FIG. 2 and FIG. 5 shows a section along the line V-V of FIG. 2.

DETAILED DESCRIPTION

Figure 1:
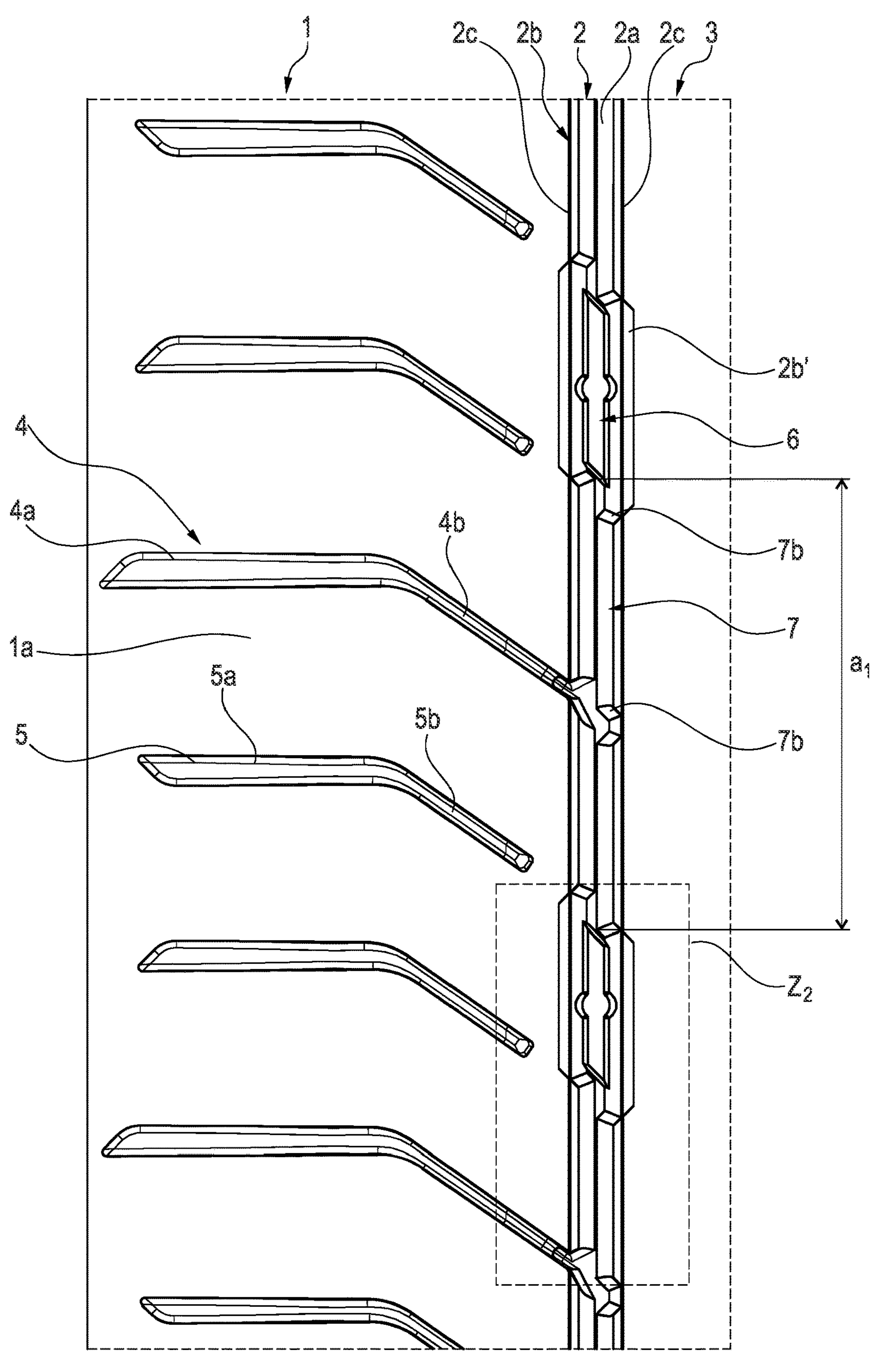
FIG. 1 shows a plan view of a shoulder-side cut-out of a tread flattened onto a plane of a pneumatic vehicle tire with a design variant of the invention.

Pneumatic vehicle tires designed according to the invention are tires for motor vehicles, in particular for multi-track motor vehicles, and preferably radial tires for passenger cars, vans, light trucks (small delivery trucks with a permissible gross vehicle weight of ≤3.5 t, light trucks with a permissible gross vehicle weight of ≤7.5 t) or SUVs.

FIG. 1 shows a plan view of a cut-out of a tread with a shoulder-side profile rib 1, which is separated from a further, only schematically indicated, circumferential profile rib 3 by a shoulder-side circumferential groove 2 running straight in plan view.

The shoulder-side profile rib 1 is provided with a multiplicity of transverse grooves 4, which lead into the circumferential groove 2 and lend the shoulder-side profile rib 1 block-like rib elements 1*a*, wherein two evenly distributed transverse grooves 5 that end before the circumferential groove 2 are formed in each rib element 1*a*. The transverse grooves 4, 5 run parallel to one another, when viewed in plan view, and are respectively made up of a transverse groove portion 4*a* (transverse groove 4), 5*a* (transverse groove 5) on the outer side of the tread, running in the axial direction in plan view, and a transverse groove portion 4*b* (transverse grooves 4), 5*b* (transverse grooves 5) on the inner side of the tread, running at an angle of 25° to 45° in relation to the axial direction in plan view.

The circumferential groove 2 has a groove base 2*a*, two groove flanks 2*b* and two groove edges 2*c* running straight in plan view and beveled in portions, so that the groove flanks 2*b* are adjoined by bevels 2*b*' running to the tread periphery, still to be discussed in further detail. When viewed in cross section, the groove flanks 2*b* run at an angle α (FIG. 3, FIG. 4) of 0° to 5° in relation to the radial direction. When viewed in cross section, the groove base 2*a* is formed as rounded in a flat U-shaped manner (FIG. 4).

Free-standing bar-like webs 6, which are at a distance from the groove flanks 2*b* and are positioned in the middle of the circumferential groove 2, are formed on the groove base 2*a* in the circumferential groove 2, wherein successive webs 6 in the circumferential direction are at a distances $a_1$ from one another of 50.0 mm to 75.0 mm in the circumferential direction, determined as smallest possible distances. Furthermore, two bar-like protrusions 7, which sit on the groove base 2*a* and between which the transverse groove portions 4*b* of the transverse grooves 4 on the inner side of the tread enter the circumferential groove 2, are formed between successive webs 6 in the circumferential direction along each groove flank 2*b*. According to FIG. 3, the circumferential groove 2 has between its groove edges 2*c*, that is to say in the areas outside the bevels 2*b*', a width $B_1$ of 6.0 mm to 8.0 mm and at the locations where it is free from webs 6 is formed in the radial direction to the intended profile depth $T_P$, which is preferably 6.5 mm to 13.0 mm, in particular up to 10.0 mm.

As shown in FIG. 2, the protrusions 7 formed on the one groove flank 2*b* are offset in relation to the protrusions 7 formed on the other groove flank 2*b* in the circumferential direction and have an offset $a_2$, determined in the circumferential direction between similarly positioned ends of the protrusions 7, of 3.0 mm to 5.0 mm. According to FIG. 2 and FIG. 3, each protrusion 7 is delimited in the radial direction by a top surface 7*a*, in the circumferential direction by two end surfaces 7*b* (FIG. 2) and laterally by a side surface 7*c* running to the groove base 2*a*. According to FIG. 3, the top surface 7*a* descends from the respective groove flank 2*b* in the direction of the middle of the circumferential groove 2 in the radial direction and, when viewed in the cross section oriented in the axial direction, runs at a constant angle β of 30° to 55°, in particular of 40° to 50°, in relation to the radial direction. According to FIG. 2, the end surfaces 7*b* are sloping in relation to the axial direction and inclined in opposite directions in relation to the axial direction in such a way that the protrusion 7 has at the level of the top surface 7*a* on the corresponding groove flank 2*b* a maximum circumferential length $c_V$ (circumferential length at the longest point measured in the circumferential direction) of 18.0 mm to 25.0 mm, wherein the maximum circumferential length $c_V$ is preferably at the same time 30% to 50%, particularly preferably up to 45%, of the aforementioned distance $a_1$ (FIG. 1) between the webs 6. As FIG. 3 also shows, when viewed in the cross section oriented in the axial direction, the side surface 7*c* is curved in the form of a circular arc, at least in portions, in such a way that it adjoins the groove base 2*a* continuously (without any sharp angles). In the exemplary embodiment shown, in those circumferential portions in which the side surface 7*c* of a protrusion 7 lying on the one groove flank 2*b* lies directly axially opposite the side surface 7*c* of a protrusion 7 lying on the other groove flank 2*b*, the side surfaces 7*c* also run to the groove base 2*a*. Alternatively, the side surfaces 7*c* in the aforementioned circumferential portions may adjoin one another at the profile depth $T_p$, so that the groove base 2*a* is missing in portions. The top surface 7*a* and the side surface 7*c* adjoin one another via a protrusion edge 7*d*, which in plan view runs in the circumferential direction (FIG. 2) and in the radial direction at a constant depth $t_1$ of 60% to 80%, in particular of 65% to 75%, of the profile depth $T_P$.

As FIG. 2 in combination with FIG. 3 shows, between protrusions 7 lying opposite one another in the axial direction there remains in each case a cross-sectionally U-shaped groove-base channel 8, which—depending on the design of the side surfaces 7*c*—is delimited either by opposing circumferential portions of the side surfaces 7*c* and the groove base 2*a* or exclusively by the opposing circumferential portions of the side surfaces 7*c*. According to FIG. 3, each groove-base channel 8 between the protrusion edges 7*d* has in the axial direction a constant width $b_{RG}$ of 45% to 65%, in particular of 50% to 60%, of the width $B_1$ of the circumferential groove 2.

As FIG. 2 shows, in plan view each web 6 is elongate in the circumferential direction, is at equal distances from the groove flanks 2*b* in the axial direction and is made up of a middle part 9, which is parallelogram-shaped in plan view and formed in the middle in the circumferential groove 2, and two side parts 10, each of a smaller volume in comparison with the middle part 9 and axially adjoining the middle part 9 laterally (one of the side parts 10 is indicated by a dotted line).

The web 6 is delimited in the radial direction by a top surface 11, which is aligned parallel to the tread periphery, in the circumferential direction by end surfaces 12, which in plan view slope in relation to the axial direction, and axially laterally by side surfaces 13, which in plan view run in the circumferential direction and are interrupted in the area of the side parts 10. When viewed in the cross section oriented in the circumferential direction, the end surfaces 12 run at an angle of 0° to 3°, in particular of at least 1°, in relation to the radial direction (not shown). When viewed in the cross section oriented in the axial direction, the side surfaces 13 run at an angle γ (FIG. 4) of 1° to 3° in relation to the radial direction.

The side parts 10 lie directly opposite one another in the axial direction, separated by the middle part 9, and are positioned symmetrically in relation to one another with respect to a longitudinally sectional center plane $E_1$ of the web 6 defined by the circumferential direction and the radial direction. Furthermore, the side parts 10 are each formed symmetrically with respect to a cross-sectional center plane $E_2$ of the web 6 defined by the axial direction and the radial direction. The side parts 10 locally widen the web 6, are outwardly rounded and are delimited in the radial direction by the top surface 11 and also by a side surface 14, which adjoins the top surface 11 and in plan view runs in the form of a circular arc, wherein the two side surfaces 14—corresponding to the rounding of the side parts 10—are in plan view curved convexly in relation to one another and each side surface 14 has at the level of the top surface 11 a delimiting edge 14*a* running in the form of a circular arc. When viewed in the cross section running perpendicularly to the associated delimiting edge 14*a* in plan view, the side surfaces 14 run in the radial direction (FIG. 5) or at an angle of up to 2° in relation to this direction. The delimiting edges 14*a* of the two side surfaces 14 also run on a common radius $r_1$.

The web 6 has a maximum circumferential length $c_S$, determined at the level of the top surface 11 and projected in the circumferential direction, of 8.0 mm to 12.0 mm, in the radial direction a height $h_S$ (FIG. 4), determined with respect to the level of the profile depth $T_P$ and with reference to the top surface 11, of 7% to 30%, in particular of 10% to 20%, of the profile depth $T_P$ (FIG. 4) and in the area of the side parts 10 a maximum width $b_{S, MAX}$ (FIG. 5), determined in the axial direction on the top surface 11, of 70% to 100%, in particular of 80% to 90%, of the width $b_{RG}$ of the groove-base channel 8 (FIG. 3). Furthermore, the web 6 has in the area outside the side parts 10 and the end surfaces 12 a constant width $b_S$ (FIG. 4), determined in the axial direction on the top surface 11, which is at least 0.5 mm, in particular 1.0 mm to 1.5 mm, less than the maximum width $b_{S, MAX}$ (FIG. 5).

As FIG. 2 also shows, the already mentioned bevels 2*b*' adjoining the groove flanks 2*b* and running to the tread periphery are formed on the sides of the webs 6, so that there is a web 6 in each case in the area between the bevels 2*b*'. The bevels 2*b*' are sloping surfaces which, when viewed in the cross section oriented in the axial direction, appear as straight lines, run at an angle δ (FIG. 4) of 35° to 55°, in particular of 45° to 50°, in relation to the radial direction and have a width $b_F$ (FIG. 4) of 1.2 mm to 2.0 mm and a maximum circumferential length $c_F$ of 18.0 mm to 25.0 mm. The bevels 2*b*' formed on the one groove flank 2*b* are offset in the circumferential direction from the bevels 2*b*' formed on the other groove flank 2*b*, wherein the bevel 2*b*' located on the one groove flank 2*b* "overlaps" the bevel 2*b*' located on the other groove flank 2*b*—in relation to the circumferential direction—in portions. The one bevel 2*b*' overhangs the web 6 in one circumferential direction and the other bevel 2*b*' overhangs the web 6 in the other circumferential direction. The offset determined between the bevels 2*b*' is equal to the aforementioned offset $a_2$ of the protrusions 7.

The invention is not limited to the exemplary embodiment described. The bevels are optional. The number of protrusions in the area between successive free-standing webs in the circumferential direction may be in particular one to three on each groove flank. The circumferential groove provided with webs and protrusions may be a central circumferential groove, i.e. a circumferential groove which separates central profile ribs from one another.

LIST OF REFERENCE SIGNS

1 Shoulder-side profile rib
1*a* Rib element
2 Shoulder-side circumferential groove
2*a* Groove base
2*b* Groove flank
2*b* Bevel
2*c* Groove edge
3 Profile rib
4 Transverse groove
4*a* Transverse groove portion on the outer side of the tread
4*b* Transverse groove portion on the inner side of the tread
5 Transverse groove
5*a* Transverse groove portion on the outer side of the tread
5*b* Transverse groove portion on the inner side of the tread
6 Web
7 Protrusion
7*a* Top surface
7*b* End surface
7*c* Side surface
7*d* Protrusion edge
8 Groove-base channel
9 Middle part
10 Side part
11 Top surface
12 End surface
13 Side surface
14 Side surface
14*a* Delimiting edge
$a_1$ Distance
$a_2$ Offset
$B_1$ Width
$b_{RG}$ Width
$b_S$ Width $b_{S, MAX}$ Maximum width
$c_F$, $c_S$, $c_V$ Maximum circumferential length
$E_1$ Longitudinally sectional center plane
$E_2$ Cross-sectional center plane
$h_S$ Height
$r_1$ Radius
$t_1$ Depth
$T_P$ Profile depth
$Z_2$ Detail
α, β, γ, δ Angle

The invention claimed is:

1. A pneumatic vehicle tire comprising:

a tread with a circumferential groove, being formed to a profile depth ($T_P$), and has a groove base and groove flanks (2*b*);

free-standing webs, which are at a distance from one another in a circumferential direction, are elongate in the circumferential direction and have a top surface running parallel to a tread periphery, being formed on the groove base;

at least one protrusion, which sits on the groove base and is elongate in the circumferential direction, is formed between successive webs in the circumferential direction on and along each groove flank;

wherein one protrusion of the at least one protrusion overlaps other protrusions with respect to the circumferential direction, so that between the protrusions there remains a groove-base channel, which has a constant width ($b_{RG}$) in an axial direction between protrusion edges which are formed on the protrusions and run at a constant depth ($t_1$) and in the circumferential direction;

wherein each web is locally widened on each side in the middle by an outwardly rounded side part, which is partly delimited by a top surface of the web, wherein one side part lies opposite an other side part and wherein the web has at the side parts a maximum width ($b_{S, MAX}$), determined in the axial direction at the level of the top surface, of at most 100% of the width ($b_{RG}$) of the groove-base channel;

wherein the maximum width is at least 70% of the width of the groove-base channel;

wherein the constant width ($b_{RG}$) of the groove-base channel is 60%, of the width ($B_1$) of the circumferential groove at the tread periphery;

wherein the web has in the area outside its side parts a width ($b_S$), determined in the axial direction at the level of the top surface, which is at least 1.5 mm, smaller than the maximum width ($b_{S, MAX}$) of the web present in the area of the side parts;

wherein the side parts are positioned symmetrically in relation to one another with respect to a longitudinally sectional center plane ($E_1$) of the web defined by the circumferential direction and the radial direction;

wherein the height ($h_S$) of the web is 10% to 20% of the profile depth ($T_P$); and wherein on the sides of each web, the groove flanks are provided with bevels (2*b*'), which run to the tread periphery, overhang the web in the circumferential direction, at least on one side, run at an angle (δ) of 40° to 50°, in relation to the radial direction and have a width ($b_F$) of 1.2 mm to 2.0 mm and a circumferential length ($c_F$) of 18.0 mm to 25.0 mm;

wherein the side parts are formed symmetrically with respect to a cross-sectional center plane ($E_2$) of the web defined by the axial direction and the radial direction; and wherein the web has a maximum circumferential length ($c_S$), determined at the level of the top surface and projected in the circumferential direction, of 8.0 mm to 12.0 mm.

2. The pneumatic tire of claim 1, wherein the tire is an off-road SUV tire.

3. The pneumatic tire of claim 1, wherein protrusions in the groove flank are offset in relation to protrusions formed in the other groove flank.

4. The pneumatic tire of claim 1, wherein a side surface of a side part is curved in the form of a circular arc and adjoins the groove base continuously.

* * * * *